(12) United States Patent
Hatanaka (10) Patent No.: US 10,809,672 B2
(45) Date of Patent: Oct. 20, 2020

(54) MEASUREMENT SYSTEM

(71) Applicant: FANUC CORPORATION, Yamanashi (JP)

(72) Inventor: Noriaki Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 73 days.

(21) Appl. No.: 15/797,133

(22) Filed: Oct. 30, 2017

(65) Prior Publication Data

US 2018/0120789 A1    May 3, 2018

(30) Foreign Application Priority Data

Oct. 31, 2016    (JP) ................... 2016-213523

(51) Int. Cl.
*G05B 13/02*    (2006.01)
*G05B 19/404*    (2006.01)

(52) U.S. Cl.
CPC ....... *G05B 13/0255* (2013.01); *G05B 19/404* (2013.01); *G05B 2219/34406* (2013.01)

(58) Field of Classification Search
CPC ............. G05B 13/0255; G05B 19/404; G05B 2219/34406
See application file for complete search history.

(56) References Cited

U.S. PATENT DOCUMENTS

| | | | | |
|---|---|---|---|---|
| 5,311,080 A | * | 5/1994 | Britton ............ | H03K 19/17744 326/21 |
| 5,727,170 A | * | 3/1998 | Mitchell ............... | G05B 19/05 710/10 |
| 6,321,600 B1 | * | 11/2001 | Hirose ............... | G01P 15/0922 73/514.01 |
| 2003/0048699 A1 | * | 3/2003 | Otto ....................... | G04F 10/04 368/113 |

(Continued)

FOREIGN PATENT DOCUMENTS

| JP | 5427107 B2 | 2/2014 |
|---|---|---|
| JP | 2016-91337 A | 5/2016 |
| WO | 2013/157386 A1 | 10/2013 |

OTHER PUBLICATIONS

Office Action in JP Application No. 2016-213523, dated Feb. 27, 2018, 4 pp.

*Primary Examiner* — Thomas C Lee
*Assistant Examiner* — Charles Cai
(74) *Attorney, Agent, or Firm* — Hauptman Ham, LLP (57) ABSTRACT

A measurement system includes a control device which controls a control target device in real time and transmits control data to a terminal device, and a measuring instrument which acquires data indicating a physical status of the control target device and transmits the data as measurement data to the terminal device. The control device includes a control unit and a sequence control unit, and the control unit transmits a timing signal to the measuring instrument. The control device transmits the control data that includes a (Continued)

piece of time information based on the timing signal to the terminal device. The measuring instrument transmits the measurement data that includes a piece of time information based on the timing signal to the terminal device. The terminal device compensates for a delay between the control data and the measurement data on the basis of the pieces of time information.

4 Claims, 12 Drawing Sheets

(56) References Cited

U.S. PATENT DOCUMENTS

| | | | |
|---|---|---|---|
| 2006/0053343 A1* | 3/2006 | Hayem | G06F 11/2236 714/39 |
| 2010/0018069 A1* | 1/2010 | Ould | G01B 21/042 33/503 |
| 2012/0194121 A1* | 8/2012 | Miyaji | G05B 19/404 318/615 |
| 2013/0132000 A1 | 5/2013 | Tamaki | |
| 2015/0246442 A1* | 9/2015 | Cho | B25J 13/006 700/253 |
| 2015/0304193 A1* | 10/2015 | Ishii | G05B 19/4185 709/224 |

* cited by examiner

MEASUREMENT SYSTEM

RELATED APPLICATIONS

The present application claims priority to Japanese Patent Application No. 2016-213523 filed on Oct. 31, 2016, the disclosure of which is hereby incorporated by reference herein in its entirety.

BACKGROUND OF THE INVENTION

1. Field of the Invention

The present invention relates to a measurement system and, more particularly, to a technique for performing delay time compensation between pieces of time-series data.

2. Description of the Related Art

Figure 1:
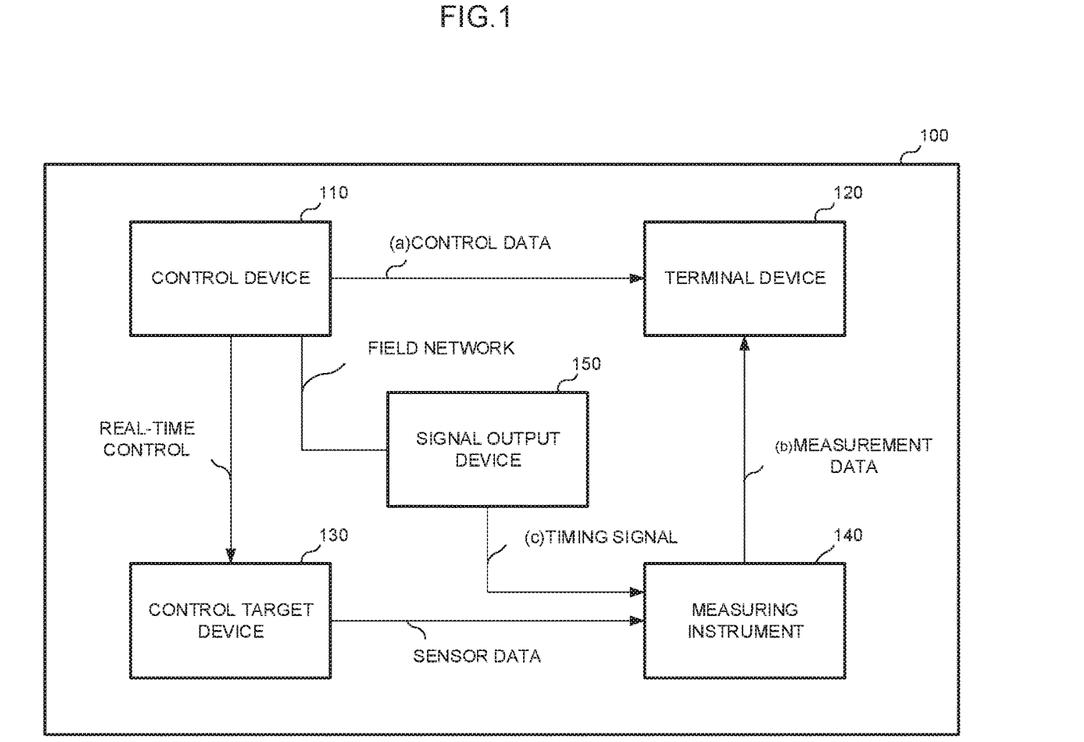
FIG. 1 is a block diagram showing the configuration of a measurement system according to a first embodiment.

FIG. 1 is a block diagram showing the configuration of a prior art measurement system. A measurement system 100 includes a control device 110, a terminal device 120, a control target device 130, a measuring instrument 140, and a signal output device 150. A numerical controller is a typical example of the control device 110. The control target device 130 is a device to be controlled by the control device 110 and is, for example, a machine tool.

The control device 110 controls the control target device 130 in real time. The control device 110 transmits (a) control data including data used in the real-time control to the terminal device 120. A piece of time information is embedded in (a) the control data. The control device 110 outputs a signal synchronized with (a) the control data to the signal output device 150 via a programmable logic controller (PLC) inside the control device 110. The signal output device 150 outputs the signal as (c) a timing signal to the measuring instrument 140.

The measuring instrument 140 acquires sensor data (for example, data indicating temperature, current, vibration, or the like) from the control target device 130. The measuring instrument 140 transmits (b) measurement data to the terminal device 120. A piece of time information based on (c) the timing signal is embedded in (b) the measurement data.

The terminal device 120 receives (a) the control data and (b) the measurement data. As for each of (a) the control data and (b) the measurement data, there is a difference, that is, a delay between a time of data occurrence and a time of reception by the terminal device 120. A delay for (a) the control data and a delay for (b) the measurement data are not equal, and a time of reception of (b) the measurement data is commonly later than a time of reception of (a) the control data. For this reason, the terminal device 120 checks the pieces of time information embedded in (a) the control data and (b) the measurement data against each other and performs delay compensation. With this delay compensation, the terminal device 120 can handle (a) the control data and (b) the measurement data as one set of pieces of time-series data.

Figure 2A:
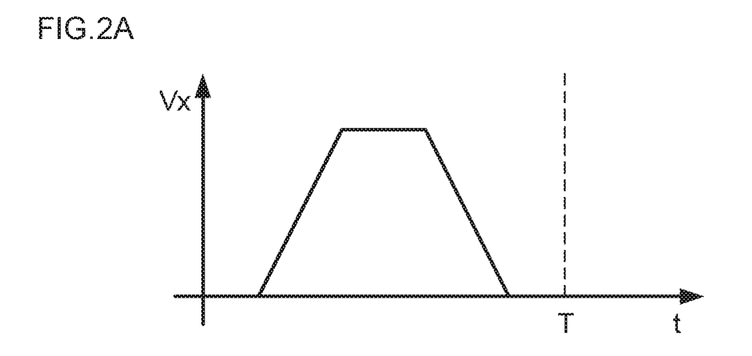
FIG. 2A is a chart for explaining a delay in control data.
Figure 2B:
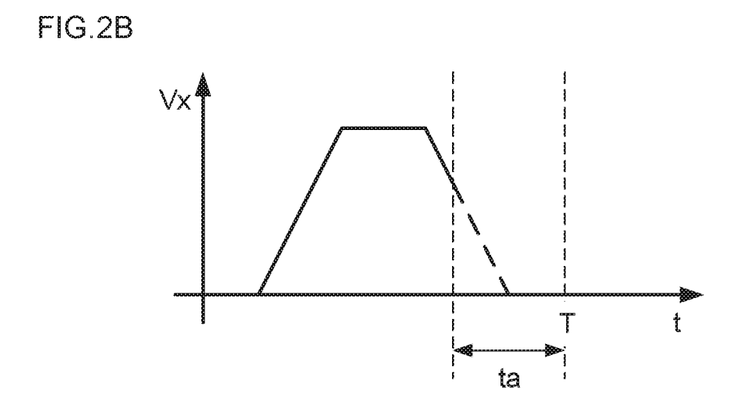
FIG. 2B is a chart for explaining the delay in the control data.

FIG. 2A shows an example of the waveform of the data used by the control device 110 to control the control target device 130 in real time. FIG. 2B shows an example of the waveform of (a) the control data received from the control device 110 by the terminal device 120. A dashed portion of the waveform indicates a piece of data unsuccessfully received by the terminal device 120. That is, at a time T, the real-time control using the data by the control device 110 is complete, but the portion (dashed portion) of (a) the control data is not received yet by the terminal device 120. This is because a delay of ta, corresponding to the time required for data transmission and reception processing in the control device 110 and the terminal device 120, occurs. However, since the piece of time information is embedded in (a) the control data, the terminal device 120 can handle (a) the control data, regardless of the delay time ta.

Meanwhile, a delay occurs when (c) the timing signal output from the control device 110 and the signal output device 150 arrives at the measuring instrument 140. The mechanism for generation of a delay in (c) the timing signal will be described with reference to FIG. 3. In (1), the control device 110 starts operation and sends out a signal synchronized with (a) the control data. In (2) or (2)', the PLC relays the signal through sequence control. That is, the PLC sends out the signal to the signal output device 150 over a field network. Since the PLC executes processing at predetermined control intervals, a delay occurs between (1) and (2) or (2)'. Subsequently, the signal output device 150 sends out (c) the timing signal. In (3) or (3)', (c) the timing signal arrives at the measuring instrument 140. A transmission delay occurs due to analog signal output. As a result, the timing signal sent out by the control device 110 arrives at the measuring instrument 140 with a delay time tc or tc'.

Figure 3:
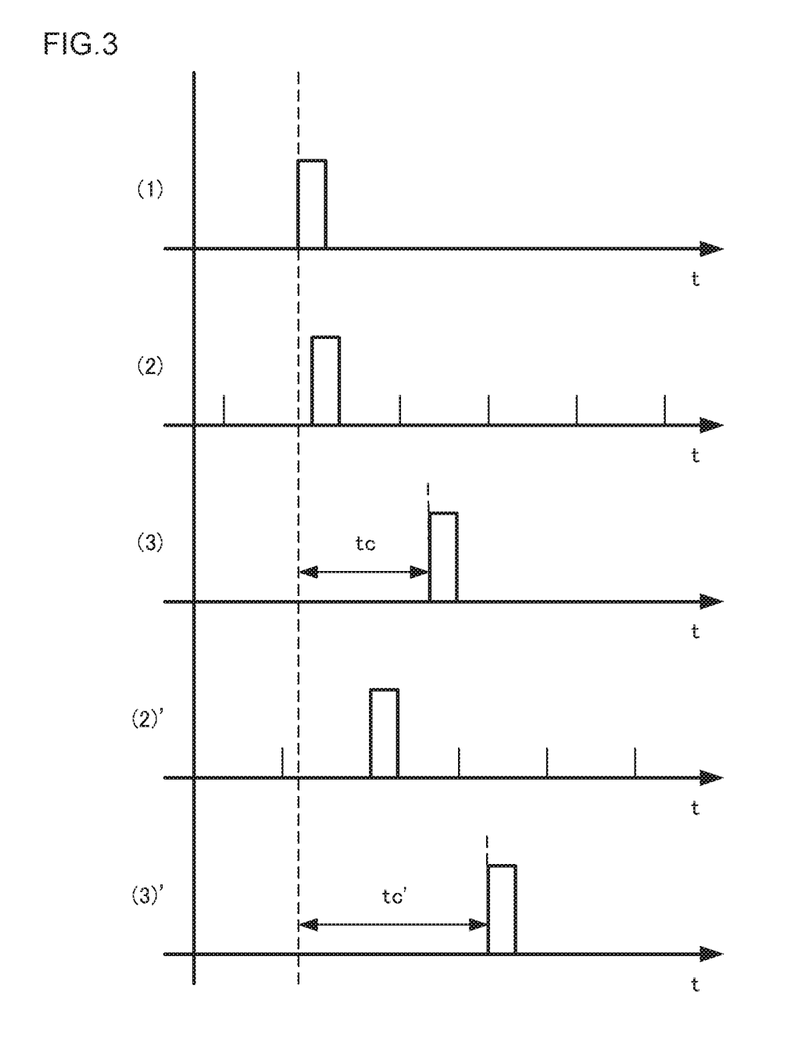
FIG. 3 is a chart for explaining a delay in a timing signal due to sequence control.

Note that a delay between the sending-out of the signal by the control device 110 in (1) and the sending-out of the signal by the PLC in (2) or (2)' is not fixed. As described above, the PLC executes processing at the predetermined control intervals. A delay time may be thus relatively short as in (2) or relatively long as in (2)'. Letting tc be a delay time in a case where a time difference between the sending-out of the signal by the control device 110 and the sequence control by the PLC is the smallest; and tc' be a delay time in a case where the time difference is the largest, tc' can be represented in the following manner using a control interval t1 for the PLC:

$$tc' = tc + t1$$

As described above, (c) the timing signal arrives at the measuring instrument 140 with a delay time ranging from tc to tc'. The measuring instrument 140 generates (b) the measurement data using the sensor data acquired from the control target device 130 and the piece of time information generated on the basis of (c) the timing signal. The measuring instrument 140 transmits (b) the measurement data to the terminal device 120. In the process of transmission, a delay of tb, corresponding to the time required for data transmission and reception processing in the measuring instrument 140 and the terminal device 120, occurs.

Figure 4A:
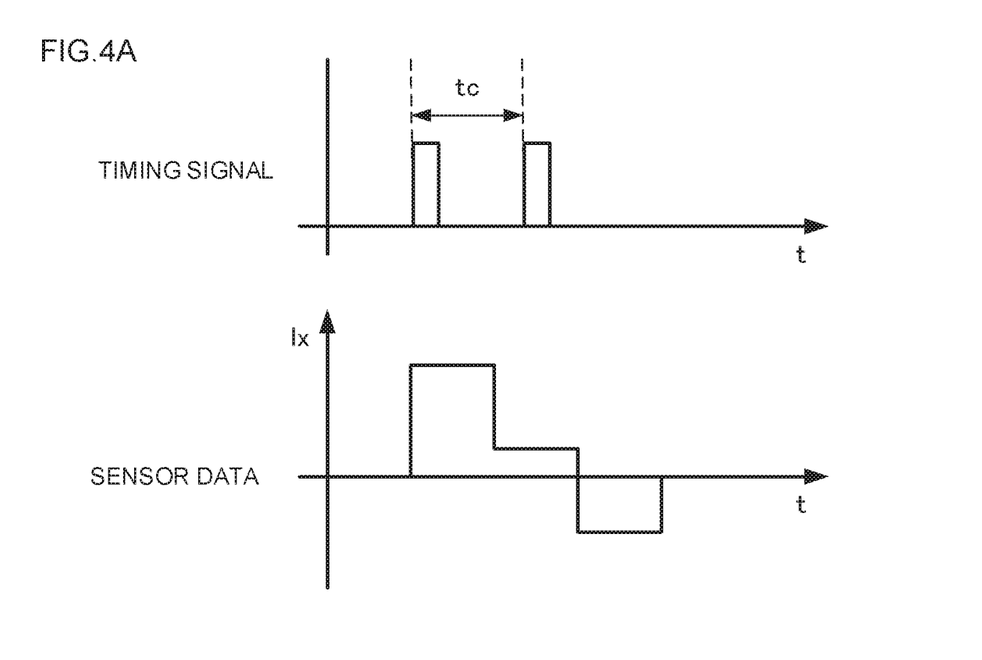
FIG. 4A is a chart for explaining an effect of a delay in the timing signal on measurement data.
Figure 4B:
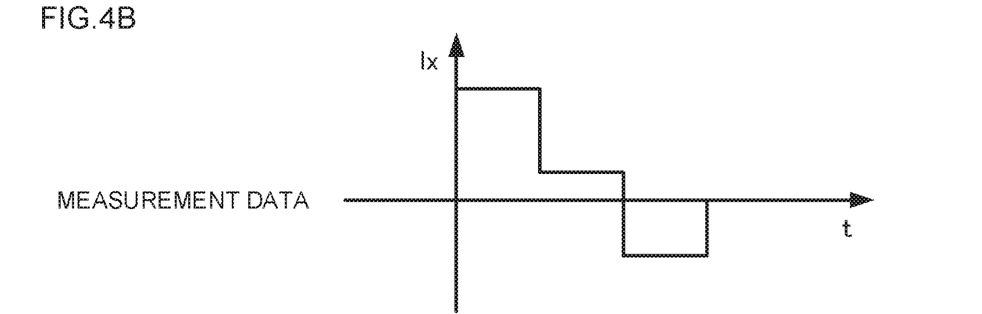
FIG. 4B is a chart for explaining an effect of the delay in the timing signal on the measurement data.
Figure 4C:
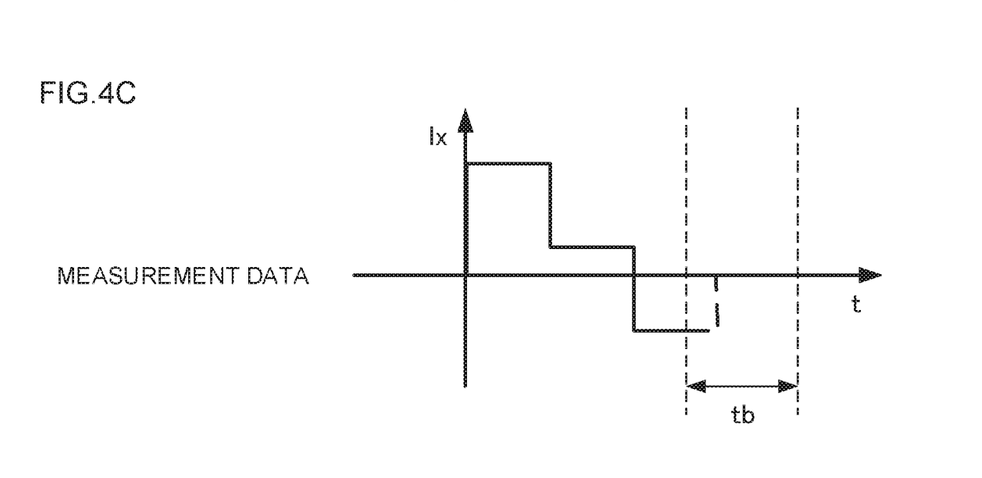
FIG. 4C is a chart for explaining an effect of the delay in the timing signal on the measurement data.
Figure 5A:
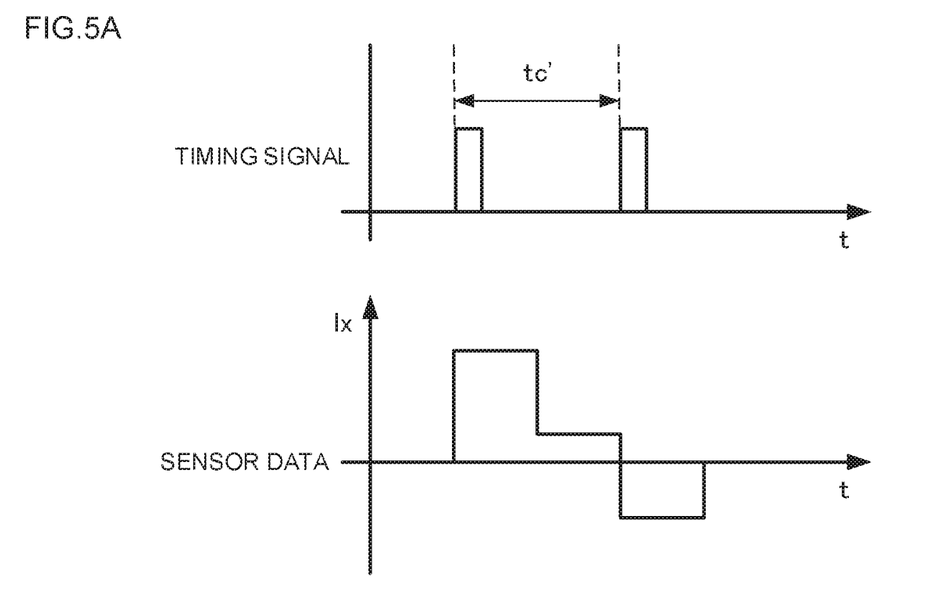
FIG. 5A is a chart for explaining an effect of a delay in the timing signal on the measurement data.
Figure 5B:
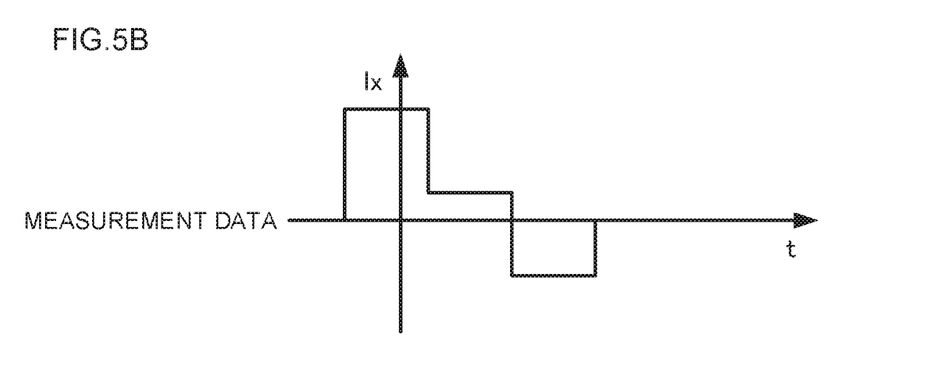
FIG. 5B is a chart for explaining an effect of the delay in the timing signal on the measurement data.
Figure 5C:
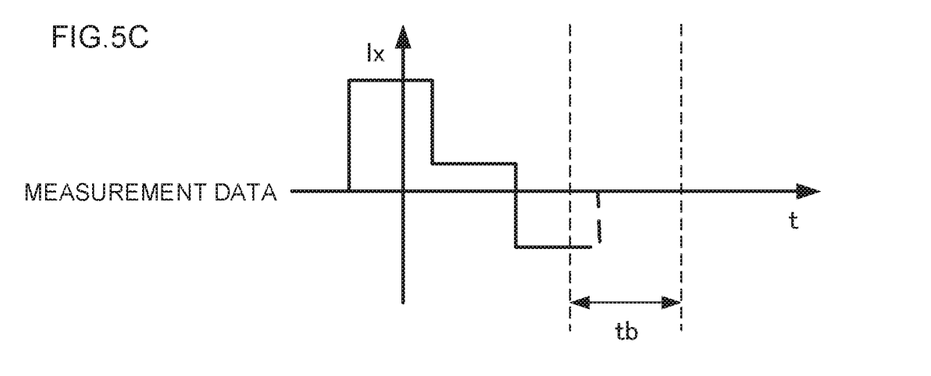
FIG. 5C is a chart for explaining an effect of the delay in the timing signal on the measurement data.

FIGS. 4A to 5C show two examples of a combination of (b) the measurement data transmitted by the measuring instrument 140 and (b) the measurement data received by the terminal device 120. FIGS. 4A to 4C show a case where (c) the timing signal has the delay time tc while FIGS. 5A to 5C show a case where (c) the timing signal has the delay time tc'. FIGS. 4A and 5A are each a chart showing real-time comparison between (c) the timing signal arriving at the measuring instrument 140 with the delay time tc or tc' and the sensor data acquired by the measuring instrument 140. FIGS. 4B and 5B are charts showing comparison in (b) the measurement data transmitted by the measuring instrument 140 using the piece of time information embedded in (b) the measurement data. FIGS. 4C and 5C are charts showing comparison in (b) the measurement data received by the terminal device 120 using the piece of time information embedded in (b) the measurement data. In each of FIGS. 4C and 5C, a portion of the data unsuccessfully received by the terminal device 120 is indicated by a dashed line.

In any case, the measuring instrument 140 generates (b) the measurement data by attaching the piece of time information based on (c) the timing signal to the sensor data. However, since (c) the timing signal ranges in delay time (as can be seen from comparison between FIGS. 4A and 5A), there is variation also in the piece of time information embedded in (b) the measurement data (as can be seen from comparison between FIGS. 4B and 5B and between FIGS. 4C and 5C).

Figure 6A:
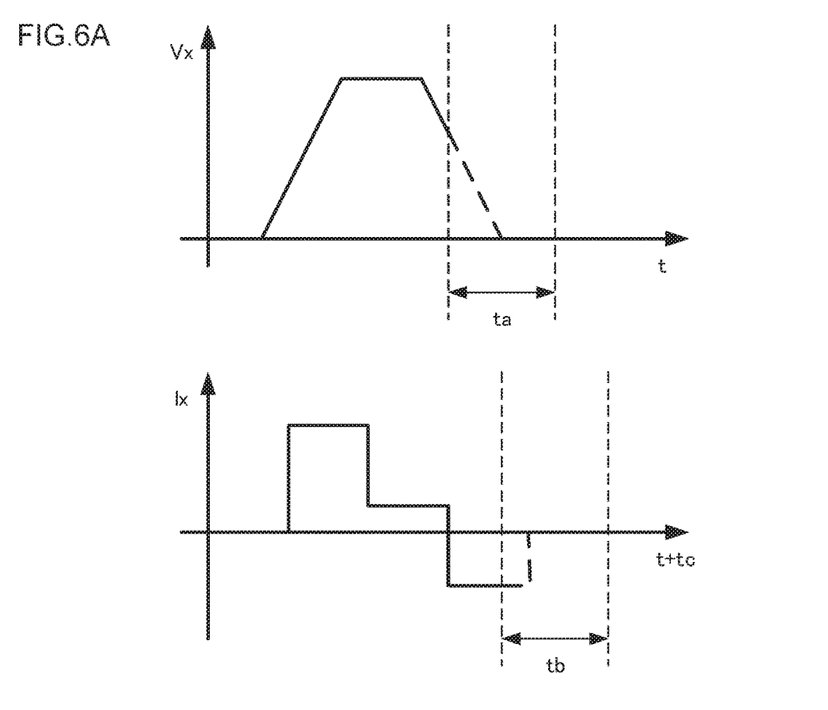
FIG. 6A is a chart for explaining a problem associated with delay compensation between the control data and the measurement data.
Figure 6B:
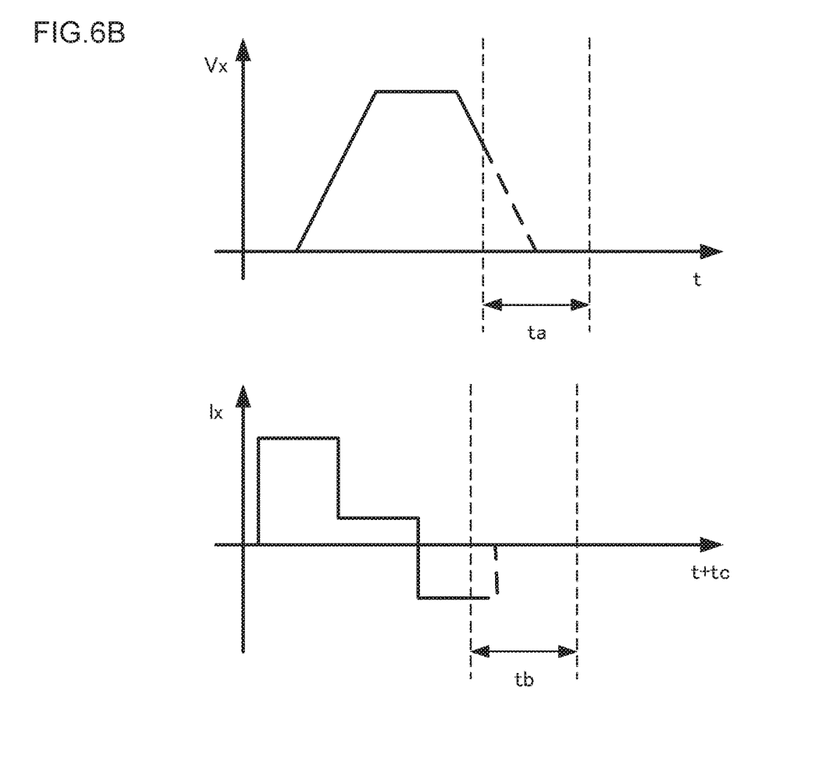
FIG. 6B is a chart for explaining the problem associated with the delay compensation between the control data and the measurement data.

The delay of tb here is a delay which occurs after the embedding of the piece of time information in (b) the measurement data, and the terminal device 120 is expected to be capable of compensating for the delay of tb using the piece of time information. That is, if (c) the timing signal has a delay of tc and the delay is fixed, the terminal device 120 can correct (b) the measurement data using a time (t+tc). However, since the width (tc'−tc) of variation in delay in (c) the timing signal is unfixed in the prior art configuration, a delay in (b) the measurement data cannot be accurately compensated for. This interferes with handling of (a) the control data and (b) the measurement data as a set of pieces of time-series data. FIG. 6A shows comparison between (a) the control data and (b) the measurement data if (c) the timing signal has a delay of tc. FIG. 6B shows comparison between (a) the control data and (b) the measurement data if (c) the timing signal has a delay of tc'. As described above, there is a difference in the correspondence relationship between (a) the control data and (b) the measurement data between the case where (c) the timing signal has a delay of tc and the case where (c) the timing signal has a delay of tc'.

Examples of a prior art technique associated with the above-described problems include Japanese Patent No. 5427107. Japanese Patent No. 5427107 describes a monitoring method for evaluating the correlation among a plurality of pieces of time-series sensor data output from a plurality of measuring instruments which measure physical quantities of a monitoring target device and, if an abnormality is detected in the correlation, determining that the monitoring target device has an abnormality.

The method described in Japanese Patent No. 5427107 is based on the premise that a plurality of pieces of time-series data are handled as a set and does not disclose a method for performing delay compensation on the pieces of time-series data.

SUMMARY OF THE INVENTION

The present invention has been made to solve the above-described problems, and has as its object to provide a measurement system capable of performing delay time compensation between pieces of time-series data.

A measurement system according to an embodiment of the present invention is a measurement system including: a control device which controls a control target device in real time and transmits control data to a terminal device; and a measuring instrument which acquires data indicating a physical status of the control target device and transmits the data as measurement data to the terminal device, in which the control device includes a control unit and a sequence control unit, the control unit transmitting a timing signal to the measuring instrument, the control device transmits the control data that includes a piece of time information based on the timing signal to the terminal device, the measuring instrument transmits the measurement data that includes a piece of time information based on the timing signal to the terminal device, and the terminal device compensates for a delay between the control data and the measurement data on the basis of the pieces of time information.

In the measurement system according to another embodiment, the sequence control unit is a PLC.

A measurement system according to another embodiment is a measurement system including: a control device which controls a control target device in real time and transmits control data to a terminal device; and a measuring instrument which acquires data indicating a physical status of the control target device and transmits the data as measurement data to the terminal device, in which the measuring instrument transmits a timing signal to the control device, the control device transmits the control data that includes a piece of time information based on the timing signal to the terminal device, the measuring instrument transmits the measurement data that includes a piece of time information based on the timing signal to the terminal device, and the terminal device compensates for a delay between the control data and the measurement data on the basis of the pieces of time information.

In the measurement system according to another embodiment, the timing signal is input to the control device using a signal input circuit for precise measurement used for a high-speed skip and the like.

A measurement system according to another embodiment is a measurement system including: a control device which controls a control target device in real time and transmits control data to a terminal device; and a measuring instrument which acquires data indicating a physical status of the control target device and transmits the data as measurement data to the terminal device, in which the terminal device compensates for a delay between the control data and the measurement data on the basis of a feature quantity extracted from the measurement data.

In the measurement system according to another embodiment, the terminal device compensates for the delay between the control data and the measurement data using, as a base point, a time when a differential or a measurement value of current data exceeds a predetermined threshold.

According to the present invention, it is possible to provide a measurement system capable of performing delay time compensation between pieces of time-series data.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Embodiments of the present invention will be described below with reference to the drawings.

First Embodiment

FIG. 1 is a block diagram showing the configuration of a measurement system 100 according to a first embodiment of the present invention. The measurement system 100 includes a control device 110, a terminal device 120, a control target device 130, a measuring instrument 140, and a signal output device 150. The roles of the components are almost the same as in the above-described prior art technique. A difference from the prior art technique lies in the internal configuration of the control device 110.

Figure 12:
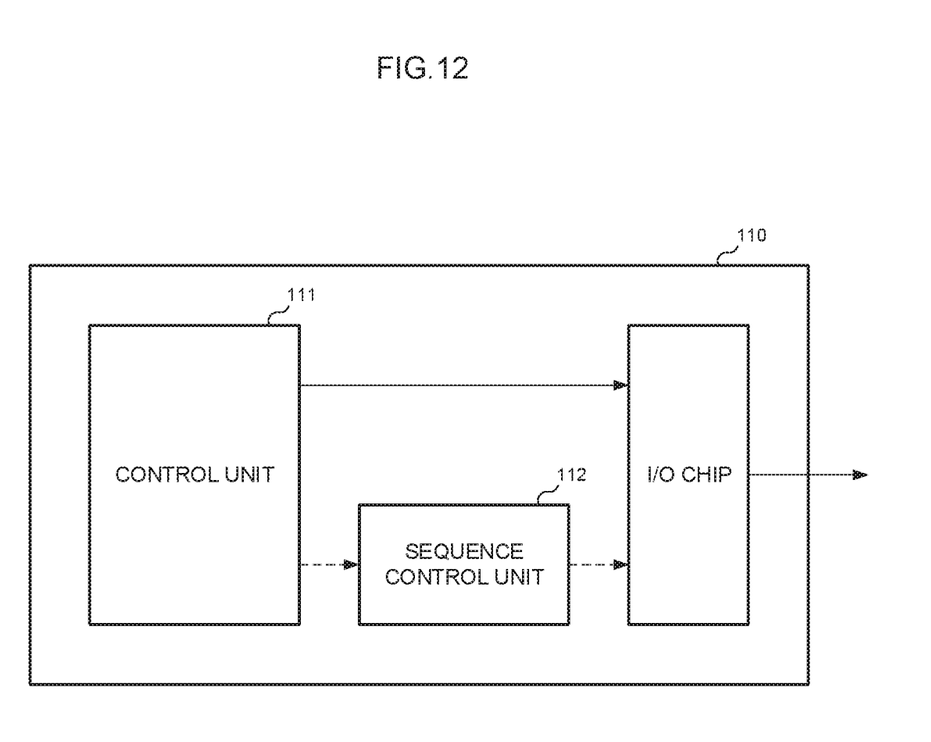
FIG. 12 is a block diagram showing the configuration of a control device.

As shown in FIG. 12, the control device 110 includes a control unit 111 and a sequence control unit 112. In the prior art control device 110, a control unit 111 typically includes at least a central processing unit (CPU), and the CPU operates in accordance with a predetermined program, thereby executing processes, such as generation of data used to control the control target device 130 in real time, generation of (a) control data to be transmitted to the terminal device 120, and generation of a signal to be output to the signal output device 150. A sequence control unit 112 typically includes at least a CPU, and the CPU operates in accordance with a predetermined program at predetermined control intervals, thereby executing processes, such as real-time control of the control target device 130, and transmission of (a) the control data and the signal to be output to the signal output device 150. More specifically, the sequence control unit 112 writes data to be transmitted to an I/O chip, and the I/O chip sends out the data to be transmitted to a predetermined transmission destination. A programmable logic controller (PLC) is a typical example of the sequence control unit 112. The sequence control unit 112 hereinafter will be referred to as the PLC 112 that is a representative example thereof.

As described above, in the prior art control device 110, the control unit 111 generates a signal synchronized with (a) the control data. After that, the PLC 112 outputs the signal to the signal output device 150. The PLC 112 executes sequence control only at predetermined intervals. That is, the control unit 111 is not synchronous with the PLC 112, and the time from generation of a signal by the control unit 111 to sending-out of (c) a timing signal by the PLC 112 is unfixed. This is a major factor for variation in a delay time for (c) the timing signal (see FIG. 3).

The control device 110 according to the first embodiment is characterized in that the control unit 111 outputs a signal synchronized with (a) control data to the signal output device 150 not via the PLC 112.

Figure 7:
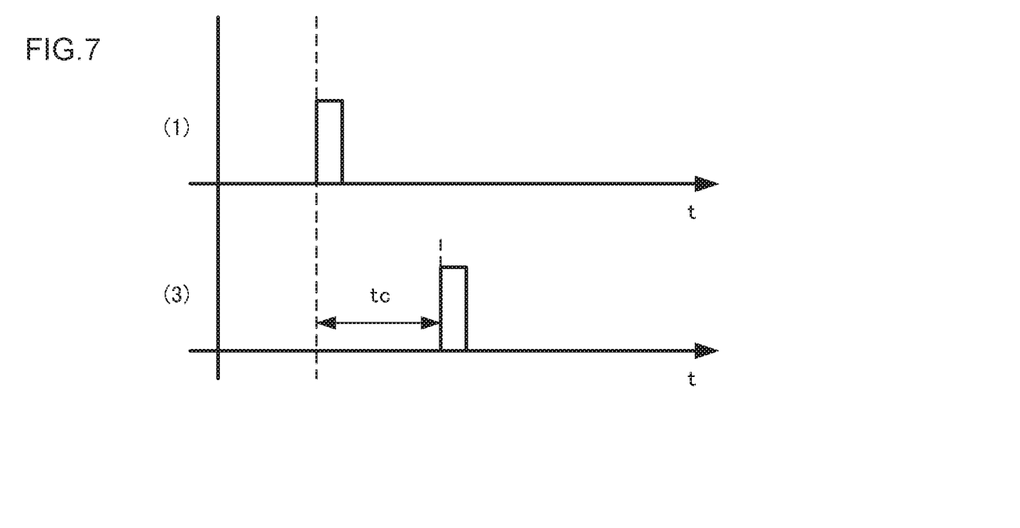
FIG. 7 is a chart showing an operation of outputting a timing signal according to a first embodiment.

FIG. 7 shows the mechanism for generation of a delay of tc in (c) a timing signal according to the present embodiment. In (1), the control unit 111 outputs a signal synchronized with (a) the control data to the signal output device 150 not via the PLC 112. That is, a CPU of the control unit 111 directly writes a signal to an I/O chip, and the I/O chip sends out the signal to the signal output device 150. In (3), the signal output device 150 then outputs the signal as (c) the timing signal to the measuring instrument 140. The signal arrives at the measuring instrument 140 with the fixed delay of tc due to a transmission path and the like. The present embodiment has no data transmission process ((2) or (2)' in FIG. 3) by the PLC 112 as in the prior art technique.

The generation and output of (c) the timing signal by the signal output device 150 here are commonly analog signal processes, and the output of (c) the timing signal from the signal output device 150 is synchronous with the signal output from the control unit 111. Although a field network or any other transmission path causes a given degree of delay, the delay is sufficiently smaller than a delay due to the PLC 112 according to the prior art technique, and variation in delay is sufficiently small.

Thus, in the present embodiment, the delay of tc in (c) the timing signal can be made to converge at a fixed value. If the delay of tc in (c) the timing signal is fixed, the terminal device 120 can correct (b) measurement data using a time (t+tc). This allows handling of (a) the control data and (b) the measurement data as a set of pieces of time-series data.

In the prior art measurement system 100, it is common to output a signal via the PLC 112 in order to improve versatility. This is because, if a signal is output via the PLC 112, a user can customize various functions using the output signal. The present inventor, however, has found that the PLC 112 adversely affects a piece of time information in (b) the measurement data. This is a problem with the prior art technique, and no prior art document has a description or suggestion of the problem. The present inventor has arrived at a configuration in which the control unit 111 directly outputs a signal not via the PLC 112 at least in a timing signal generation process. This allows acquirement of the technical effect of enhancing responsiveness at the expense of versatility.

Second Embodiment

Figure 9:
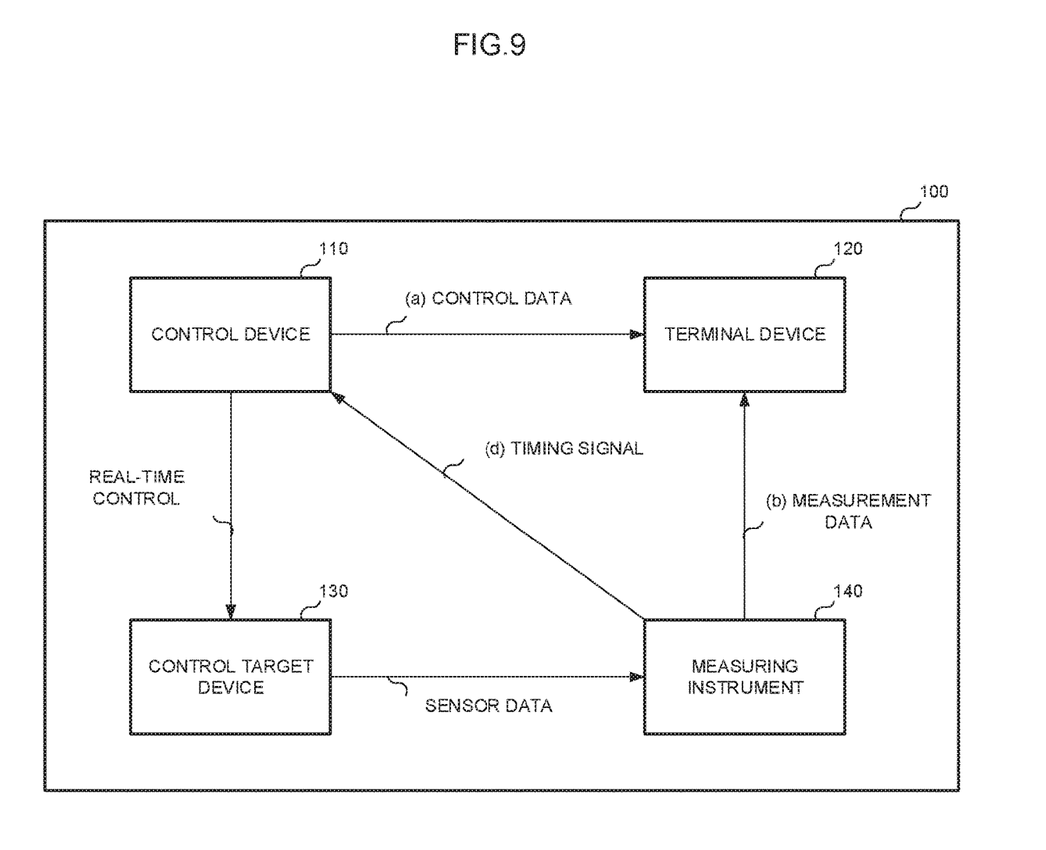
FIG. 9 is a block diagram showing the configuration of a measurement system according to the second embodiment.

FIG. 9 is a block diagram showing the configuration of a measurement system 100 according to a second embodiment of the present invention. The measurement system 100 includes a control device 110, a terminal device 120, a control target device 130, and a measuring instrument 140. A main difference from the first embodiment lies in that the signal output device 150 that outputs (c) a timing signal is not provided. In the second embodiment, the measuring instrument 140 outputs (d) a timing signal.

The measuring instrument 140 generates (d) the timing signal and outputs (d) the timing signal to the control device 110. Examples of the control device 110 include one which includes an input circuit (specifically, a signal input circuit for precise measurement used by a function called a high speed skip or the like) having a mechanism capable of accurately measuring the timing for an input signal for the purpose of, for example, accurately measuring a tool. Since a general input circuit captures an input signal at fixed control intervals, the accuracy of identifying a time of signal input is subject to the constraints of the control interval. The signal input circuit for precise measurement, however, includes a timer for measuring an elapsed time during the control interval and can identify a time of signal input in a unit smaller than the control interval. In the present embodiment, such a signal input circuit for precise measurement is used to input (d) the timing signal. With this use, the control device 110 can sufficiently reduce delays and variations at the time of taking in (d) the timing signal.

The measuring instrument 140 also acquires sensor data (for example, data indicating temperature, current, or vibration) from the control target device 130. The measuring instrument 140 generates (b) measurement data, in which a piece of time information based on (d) the timing signal is embedded, and transmits (b) the measurement data to the terminal device 120.

The control device 110 controls the control target device 130 in real time. The control device 110 generates (a) control data, in which a piece of time information based on (d) the timing signal is embedded, and transmits (a) the control data to the terminal device 120.

The terminal device 120 receives (a) the control data and (b) the measurement data. The pieces of time information based on (d) the timing signal are embedded in (a) the control data and (b) the measurement data from the beginning. The terminal device 120 checks the pieces of time information embedded in (a) the control data and (b) the measurement data against each other and performs delay compensation.

Figure 8:
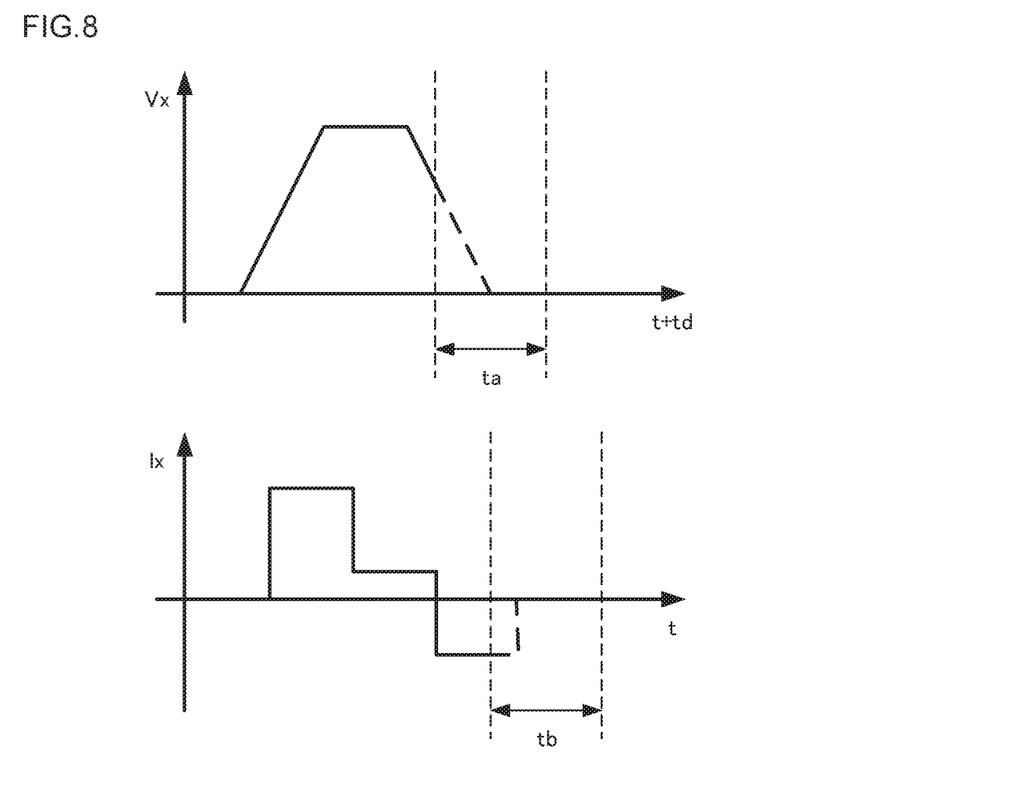
FIG. 8 is a chart for explaining a delay compensation method according to a second embodiment.

FIG. 8 shows (a) the control data and (b) the measurement data received by the terminal device 120 in the second embodiment. A dashed portion in FIG. 8 indicates a portion of data unsuccessfully received by the terminal device 120. Let td be a delay time between transmission of (d) the timing signal by the measuring instrument 140 and arrival at the control device 110. The terminal device 120 can handle (a) the control data and (b) the measurement data as a set of pieces of time-series data by correcting (b) the measurement data using a time (t+td).

In the present embodiment, the measuring instrument 140 generates (d) the timing signal, which is sent into the control device 110 using the high-speed input circuit. With this configuration, delays and variations in arrival of (d) the timing signal at the control device 110 can be reduced. That is, the delay time td for (d) the timing signal at the point of arrival at the control device 110 can be kept fixed. This allows correction of a plurality of pieces of time-series data.

Third Embodiment

Figure 10:
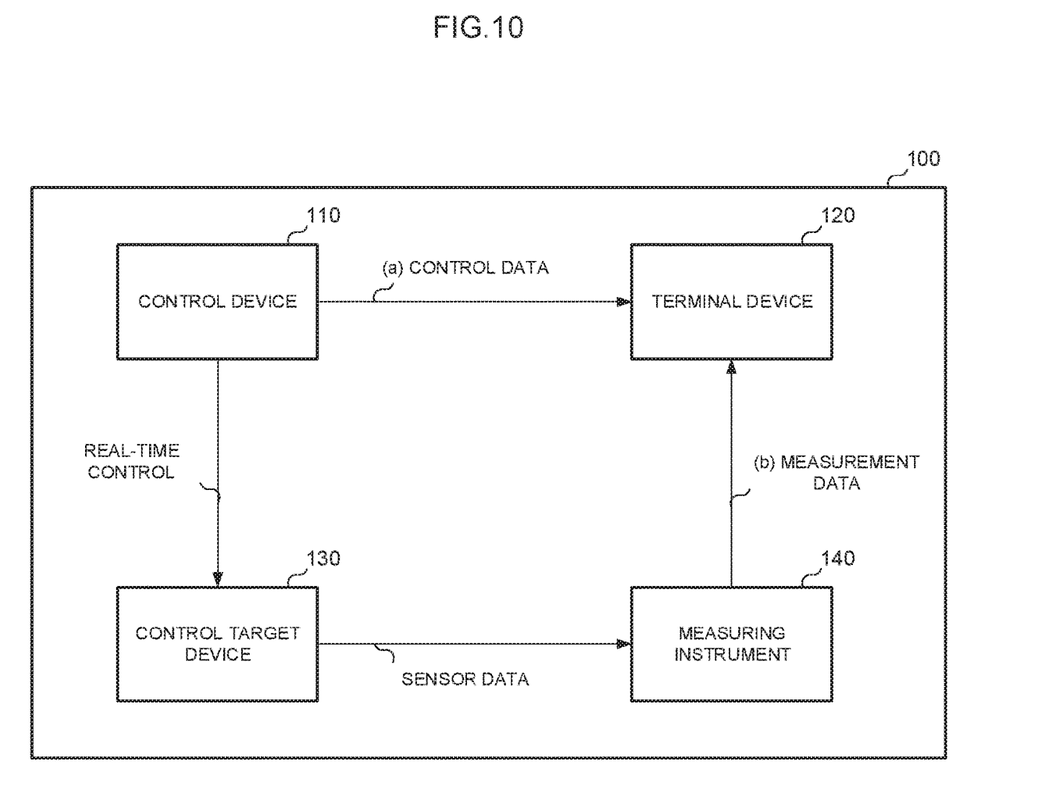
FIG. 10 is a block diagram showing the configuration of a measurement system according to a third embodiment.

FIG. 10 is a block diagram showing the configuration of a measurement system 100 according to a third embodiment of the present invention. The measurement system 100 includes a control device 110, a terminal device 120, a control target device 130, and a measuring instrument 140. A main difference from the first embodiment lies in that the signal output device 150 that outputs (c) the timing signal is not provided. In the third embodiment, sensor data output by the control target device 130, such as current data, is used as a timing signal.

The control device 110 controls the control target device 130 in real time. The control device 110 generates (a) control data and transmits (a) the control data to the terminal device 120.

The measuring instrument 140 acquires sensor data (for example, data indicating temperature, current, or vibration) from the control target device 130 and generates (b) measurement data, and transmits (b) the measurement data to the terminal device 120.

The terminal device 120 receives (a) the control data and (b) the measurement data. The terminal device 120 selects a piece of sensor data, in which a result of the real-time control is reflected with a sufficiently small delay and variation in delay is sufficiently small, from the sensor data included in (b) the measurement data, and extracts a feature from the piece of sensor data. Examples of a piece of sensor data having such a property include current data. The terminal device 120 can extract a feature from current data 1x, for example, by the following method:

(i) detecting an excess of a differential of 1x over a predetermined threshold; and (ii) detecting an excess of a measurement value of 1x over a predetermined threshold.

The differential or the measurement value of the current data 1x often exceeds the threshold at the start of real-time control. For this reason, the terminal device 120 corrects (a) the control data and (b) the measurement data such that a time of detection of the above-described feature from the current data in (b) the measurement data coincides with a time of the start of execution of a command in (a) the control data.

Figure 11A:
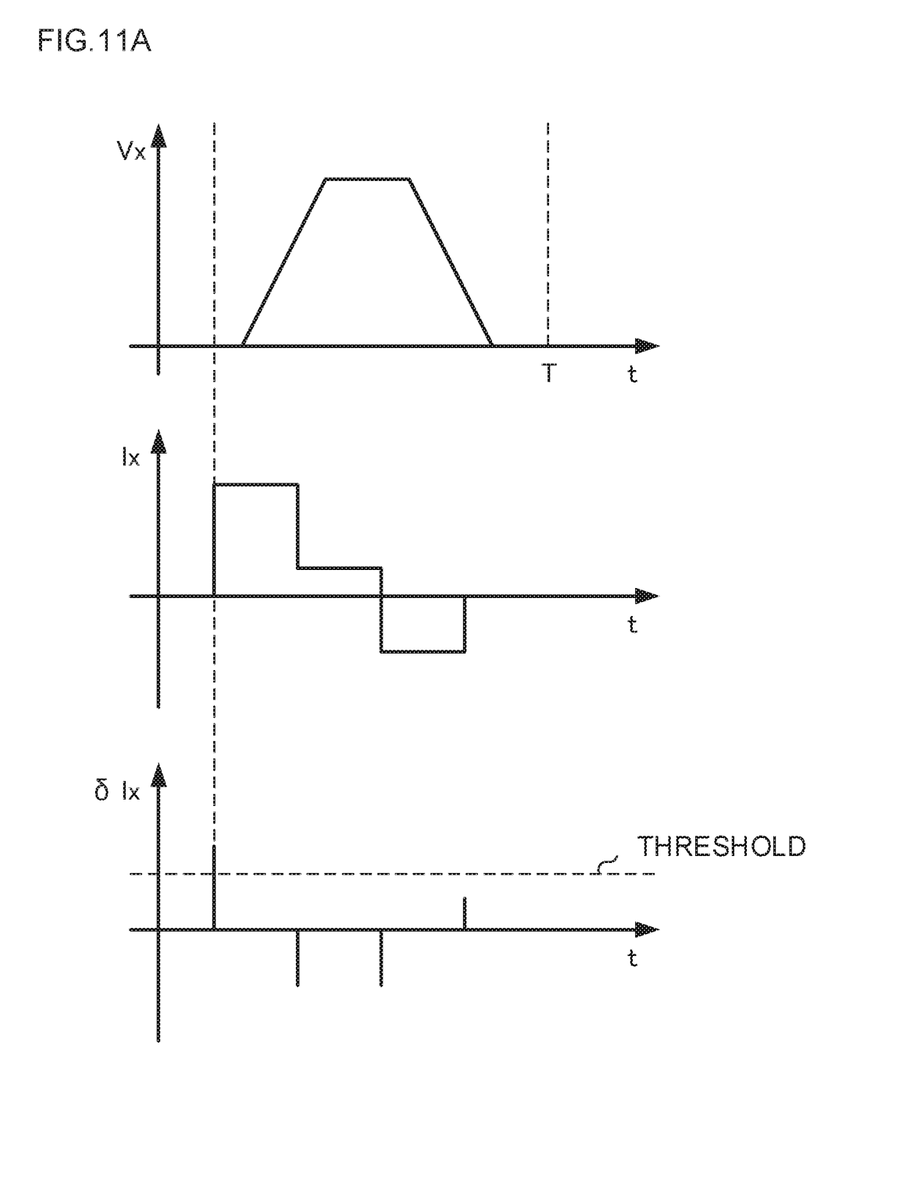
FIG. 11A is a chart for explaining a delay compensation method according to the third embodiment.
Figure 11B:
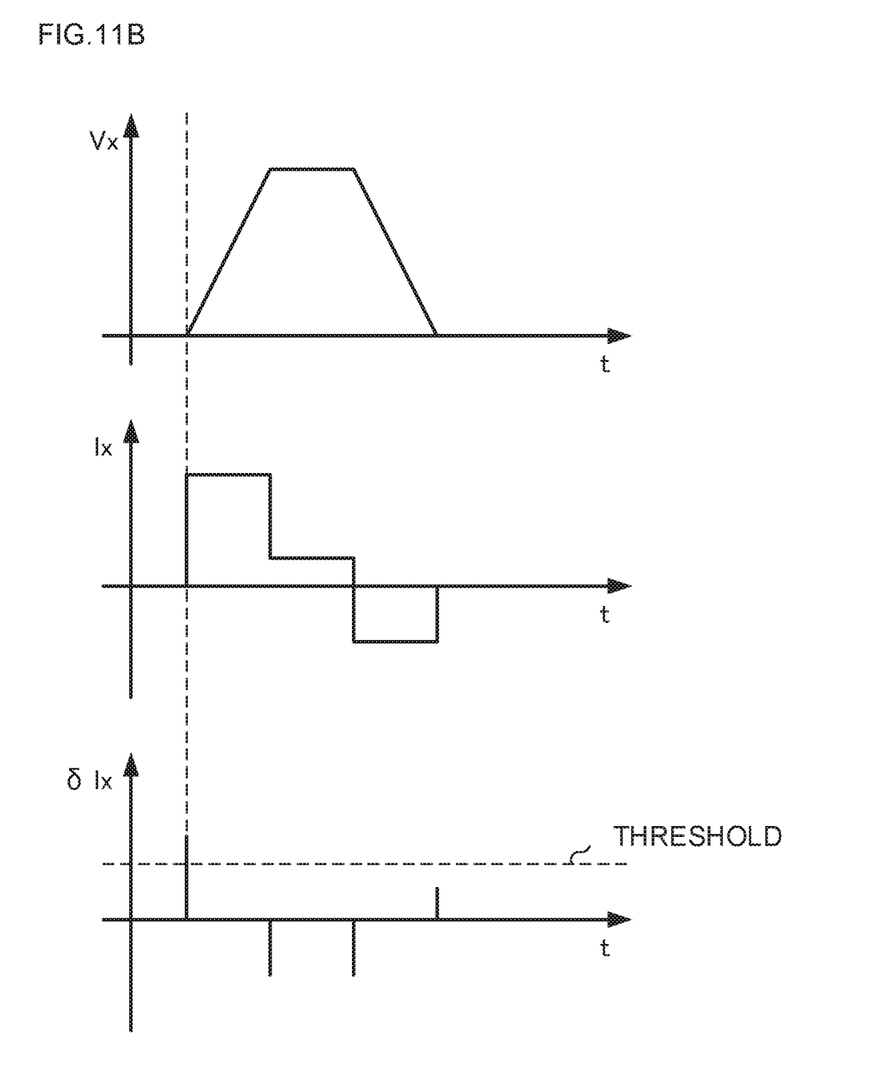
FIG. 11B is a chart for explaining the delay compensation method according to the third embodiment.

A description will be given with reference to FIGS. 11A and 11B. The top graph in FIG. 11A shows (a) the control data received by the terminal device 120, the middle graph shows (b) the measurement data received by the terminal device 120, and the bottom graph shows a feature quantity extracted from (b) the measurement data. Assume that a feature quantity above a threshold is detected in the bottom graph in FIG. 11A. At this time, the terminal device 120 corrects a shift in time between (a) the control data and (b) the measurement data such that a time of generation of the feature quantity coincides with a rising edge of (a) the control data, as shown in FIG. 11B. This allows handling of (a) the control data and (b) the measurement data as a set of pieces of time-series data.

In the present embodiment, the shift in time between (a) the control data and (b) the measurement data is corrected using the feature quantity extracted from (b) the measurement data as a base point. At this time, the feature quantity is extracted from sensor data small in a delay behind (a) the control data and fluctuation. This allows accurate delay compensation without the need for a configuration for generating a timing signal.

Note that the present invention is not limited to the above-described embodiments and that appropriate changes may be made to the embodiments without departing from the scope. As for the present invention, an arbitrary component in an embodiment may be modified or may be omitted within the scope of the invention.

For example, current data is used as sensor data, from which a feature quantity is to be extracted, in the third embodiment. The present invention, however, is not limited to this. Arbitrary sensor data may be used as long as the sensor data is small in a delay behind (a) the control data and fluctuation. A feature quantity is not limited to the above-described example, and an arbitrary feature quantity correlated with (a) the control data may be used.

If a feature quantity at an unintended time is extracted in the third embodiment, a signal indicating an operating status may be output from the control device 110 to the measuring instrument 140. The terminal device 120 can extract a feature quantity, for example, only when it can be determined, on the basis of the above-described signal, that the control device 110 is in a specific operating state (for example, in measurement mode).

Alternatively, the method using sensor data according to the third embodiment and the method using a timing signal according to the prior art technique, the first embodiment, or the second embodiment may be used in combination. According to the third embodiment, a delay which cannot be compensated for by the prior art technique, the first embodiment, or the second embodiment may be compensated for. Meanwhile, even if false detection of a feature quantity or the like occurs in the third embodiment, compensation can be performed by the method according to the first embodiment or the second embodiment. This allows more accurate delay compensation.

The embodiments of the present invention have been described above. The present invention, however, is not limited to the illustrated embodiments and may be carried out in various ways by making appropriate changes to the embodiments.

The invention claimed is:

1. A measurement system comprising:
a control device which controls a control target device in real time and transmits control data for controlling the control target device to a terminal device; and
a measuring instrument which acquires data indicating a physical status of the control target device and transmits the data as measurement data to the terminal device, wherein
the control device includes a control unit and a sequence control unit, the control unit transmitting a timing signal to the measuring instrument using a signal output device without using the sequence control unit, the control unit transmitting other signals using the sequence control unit, wherein the sequence control unit operates at a predetermined control interval,
the control device transmits, to the terminal device, the control data that includes a first piece of time information based on the timing signal transmitted to the measuring instrument using the sequence control unit,
the measuring instrument transmits, to the terminal device, the measurement data that includes a second piece of time information based on the timing signal from the control unit, and
the terminal device compensates for a delay between the control data and the measurement data on the basis of the first piece and second piece of time information, wherein the delay is the time interval required for the timing signal transmitted from the control unit to the measuring instrument.

2. The measurement system according to claim 1, wherein the sequence control unit is a programmable logic controller (PLC).

3. A measurement system comprising:
a control device which controls a control target device in real time and transmits control data for controlling the control target device to a terminal device; and
a measuring instrument which acquires data indicating a physical status of the control target device and transmits the data as measurement data to the terminal device, wherein
the measuring instrument transmits a timing signal to the control device,
the control device transmits, to the terminal device, the control data that includes a first piece of time information based on the timing signal from the measuring instrument,
the measuring instrument transmits, to the terminal device, the measurement data that includes a second piece of time information based on the timing signal,
the terminal device compensates for a delay time equal to a time interval from when the timing signal leaves the measuring instrument to when the timing signal is received by the control device,
the control device includes a signal input circuit configured to capture the timing signal sent from the measuring instrument, the signal input circuit including a timer for measuring an elapsed time within a control interval that the timing signal arrives at the signal input circuit, the control device configured to take in the timing signal within the control interval upon detection of the timing signal by the timer, wherein the delay time is equal to the sum of the time for the timing signal to travel from the measuring instrument to the control device and the measured elapsed time within the control interval, and
the terminal device is configured to adjust the measurement data based on the delay time.

4. The measurement system according to claim 3, wherein the timing signal is input to the control device using the signal input circuit for precise measurement.

* * * * *